United States Patent [19]
Van Melle et al.

[11] 3,741,366
[45] June 26, 1973

[54] DEVICE FOR ORIENTING AND STACKING SHALLOW CUPS AND LIDS

[75] Inventors: Hugh Van Melle, Herbert Rees, both of Ontario, Canada

[73] Assignee: Husky Manufacturing & Tool Works Ltd., Balton, Ontario, Canada

[22] Filed: Mar. 26, 1971

[21] Appl. No.: 128,392

[52] U.S. Cl......... 198/33 AB, 198/33 AD, 221/156, 214/7
[51] Int. Cl............................................. B65g 47/24
[58] Field of Search.................. 221/156, 157, 158, 221/159, 160, 161, 162, 171, 173; 198/33 R, 33 AA, 33 AB, 33 AD, 29

[56] References Cited
UNITED STATES PATENTS

| | | | |
|---|---|---|---|
| 3,311,218 | 3/1967 | Lederer | 198/33 AD |
| 1,702,901 | 2/1929 | Hungerford | 198/33 AD X |
| 3,388,812 | 6/1968 | Cooper | 198/33 AD |
| 1,860,491 | 5/1932 | Burtchaell | 198/33 AD |
| 2,758,434 | 8/1956 | Johnson et al. | 198/33 AD |
| 3,106,281 | 10/1963 | Mottin | 198/33 AD |
| 3,389,778 | 6/1968 | Kovacs et al. | 198/33 AB |
| 3,581,866 | 6/1971 | Hottendorf | 198/33 AD |
| 3,119,217 | 1/1964 | Brownlee | 198/33 AA |
| 2,387,674 | 10/1945 | McIntire | 198/33 AD |
| 3,306,425 | 2/1967 | Rapp, Jr. et al. | 221/156 X |

FOREIGN PATENTS OR APPLICATIONS

| | | | |
|---|---|---|---|
| 628,908 | 11/1965 | Italy | 198/33 AB |
| 216,881 | 9/1958 | Australia | 198/33 AB |

*Primary Examiner*—Robert J. Spar
*Attorney*—Karl F. Ross

[57] ABSTRACT

Disk-shaped articles with a flat and a recessed side, coming from an injection-molding machine, are entrained by an upwardly sloping conveyor to an orienting head comprising a centrally positioned roller, of a width substantially less than the disk diameter, around which the articles must pass to reach a vertical chute feeding them to a stacking tube. A stationary flipper confronting the roll, just above the chute entrance, engages the undersides of articles riding around the roller with their concavities outwardly to reorient them; other articles, facing the roller with their concave sides hug the roller more closely and therefore escape the flipper. For articles liable to overlap and nest on their way to the orienting head, the conveyor includes a stationary ledge defining one longitudinal edge of the transport path and a pair of moving belts defining the opposite longitudinal edge of that path, the two belts moving at the same speed and including a obtuse angle for unilaterally elevating and gripping a disk to advance it with a rolling motion tending to dislodge another disk resting on it. An eccentric impactor along the conveyor path, located above the level of a single disk, strikes the upper one of two nested disks to separate them.

18 Claims, 10 Drawing Figures

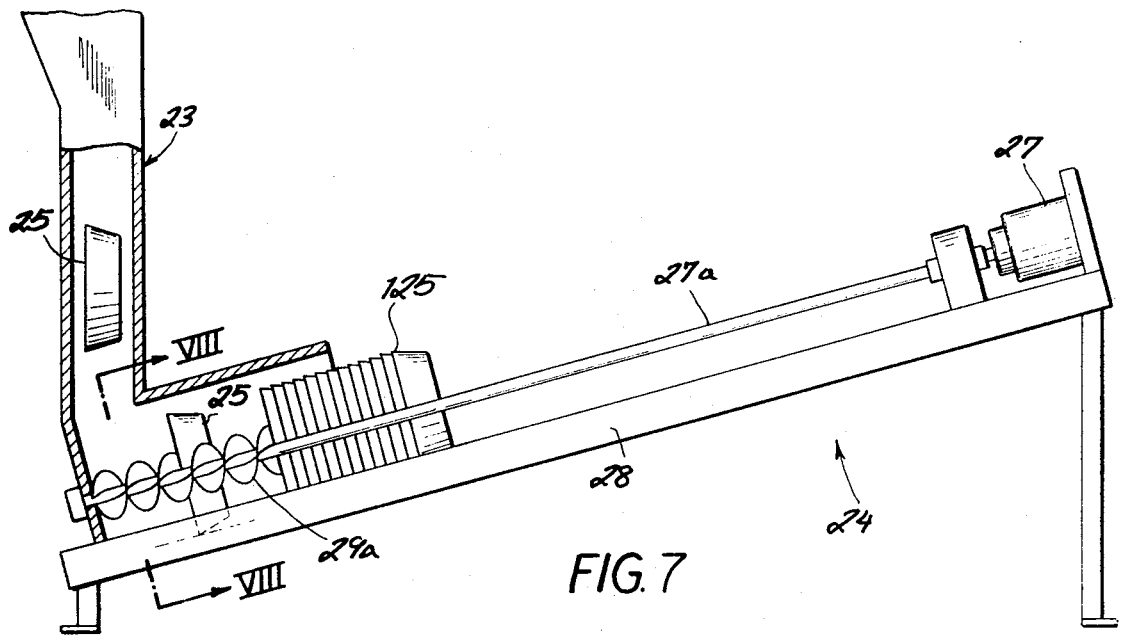
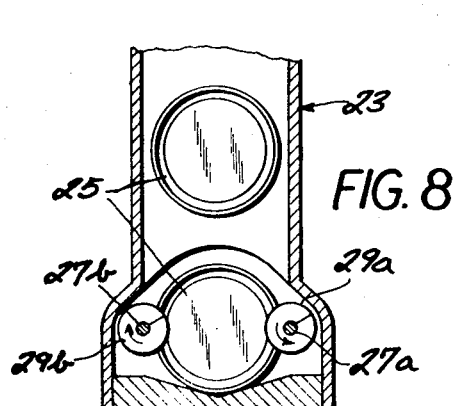
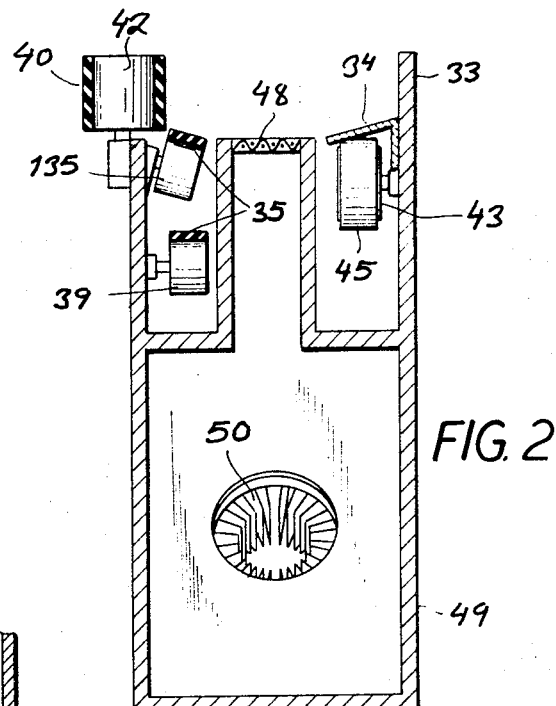
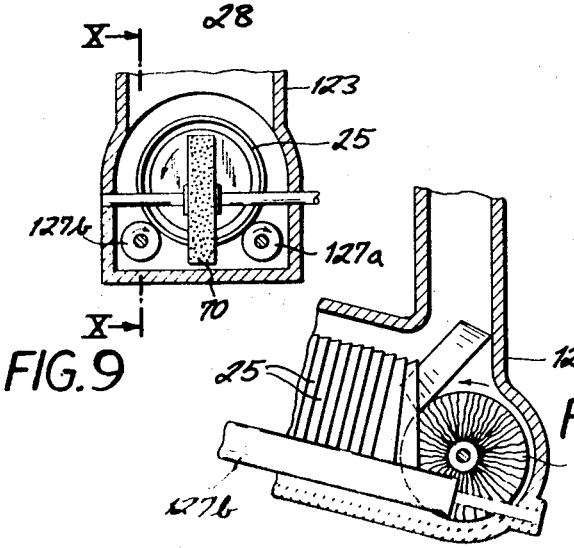

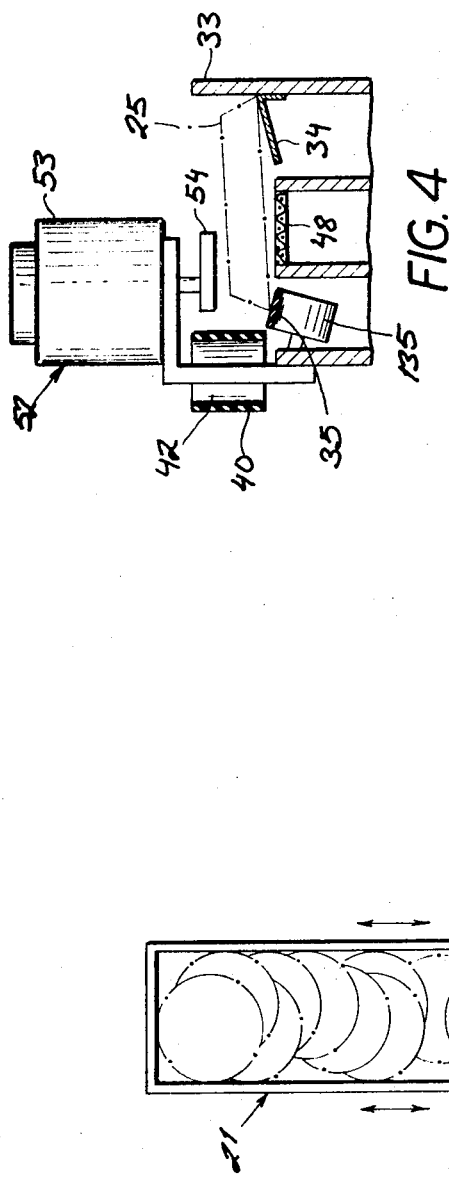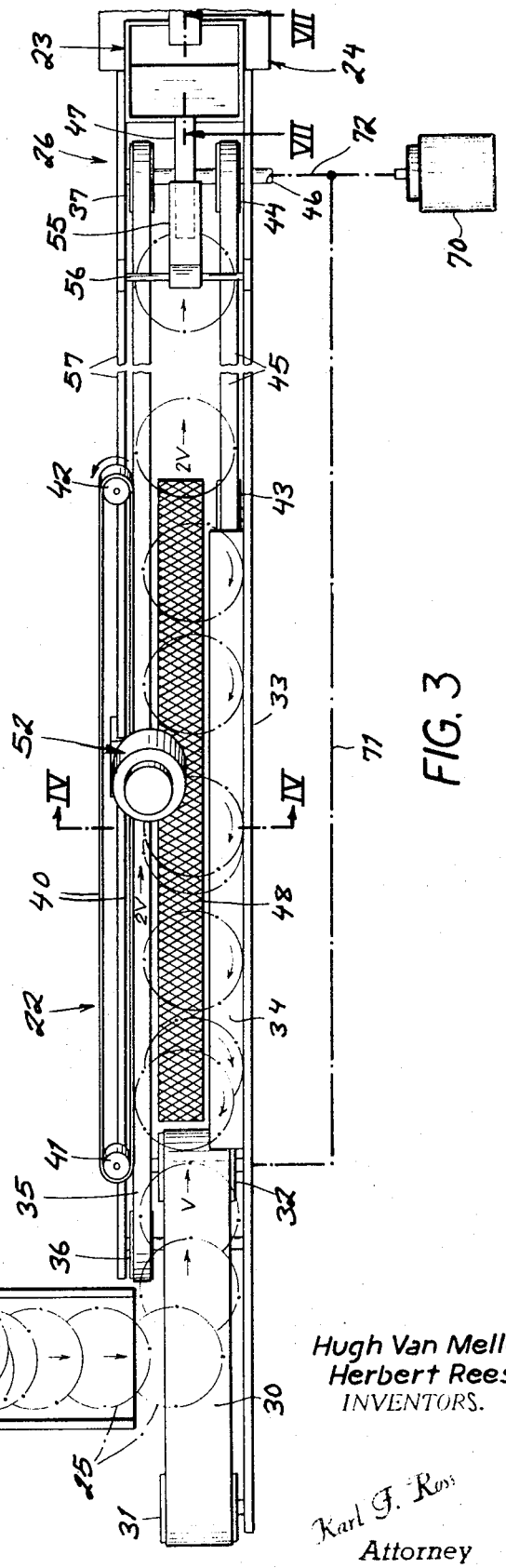

Hugh Van Melle
Herbert Rees
INVENTORS.

DEVICE FOR ORIENTING AND STACKING SHALLOW CUPS AND LIDS

Our present invention relates to a device for collecting and removing, in an oriented fashion, articles serially produced by an injection-molding machine, as generally disclosed in our copending application Ser. No. 19,798 filed 16 Mar. 1970, now U.S. Pat. No. 3,623,593.

The apparatus described in that prior application is particularly designed for the orienting and stacking of hollow frustoconical articles, such as drinking cups, which can be nested for transportation and storage. The orientation of these cups is accomplished by entraining them with the aid of two parallel conveyor belts, moving in synchronism, between which the article is suspended with its smaller end hanging down. This technique, however, is not available in the case of shallow disk-shaped articles, such as container lids, having a substantially flat side and a recessed side whose diameters differ by only a fraction of the disk thickness.

It is, therefore, the general object of our present invention to provide a device of this general type designed for the transportation and orientation of such shallow disk-shaped articles preparatorily to their stacking in a nested position.

A more specific object is to provide a device of this nature capable of handling the output of a high-speed injection-molding machine producing such articles.

Aside from the need for relatively orienting, preparatorily to stacking, a series of shallow, generally planoconcave disks arriving with random positioning from a source of supply, it is necessary to prevent premature nesting of two or more disks since this could interfere with their further transportation to the stacking device. A further object of our invention, therefore, is to provide means for separating such nested disks before they reach that channel.

In accordance with an important feature of our invention, we provide an ascending transport track for the articles to be oriented, this track including a conveyor formed at least in part by a pair of transversely spaced and synchronized endless belts disposed alongside each other substantially as taught in our prior application identified above; at the top of this track we provide a deflecting body, preferably a roller, disposed between the belts and forming a curved hump adapted to enter the concave side of any article riding these belts with its concavity down, the hump extending over an arc (usually between 90° and 135°) sufficient to guide the articles so disposed into a substantially vertical position over a path which is relatively close to the center of curvature of that body; articles disposed with their concave side up also pass around the hump but, since the latter cannot penetrate into their recesses, are guided over a path relatively remote from the center of curvature into a substantially vertical position, the two curved paths terminating just above the upper end of a guide channel designed to deliver them to a stacker. A flipper disposed next to the deflecting body intercepts and reorients the articles passing over one of the two guide paths, advantageously the outer one, so that all the articles enter the guide channel in the same position.

The flipper may be a stationary member partly overhanging the entrance to the guide channel and approaching the deflecting body substantially at the level of its axis of curvature, leaving a gap sufficient for the edgewise passage of a disk but insufficient to clear a disk occupying a substantially horizontal position. In a preferred construction, in which the deflecting body is a driven roller with a peripheral speed substantially equaling that of the flanking conveyor belts, the flipper forms a shelf which is downwardly inclined toward the roller periphery to impart a similar inclination to a disk maintaining a more or less horizontal attitude upon leaving the roller.

In accordance with another feature of our invention, the conveyor forming the ascending transport track includes a section in which rolling motion is imparted to the entrained disks. For this purpose, the conveyor section referred to comprises an unsymmetrical feeder assembly which advances one part of a disk more rapidly than a diametrically opposite part thereof. In principle, this could be done by two parallel belts moving at different speeds, yet in a simpler and therefore preferred embodiment one side of the track is formed by stationary or movable but nondriven support means while only the other track side includes a driven belt. In practice, this driven belt may extend along the track bottom and may be supplemented by another moving belt, driven at exactly or approximately the same speed, whose active surface extends substantially vertically to form a moving guard rail. The bottom belt may include with that guard rail an obtuse angle by being slightly inclined to the horizontal so as to pick up the engaged disk edge for more positive entrainment thereof. Contact between this belt and the advancing disks may be intensified by the application of suction to the track bed in the region of the unsymmetrical feeder assembly.

We have found that the rolling motion imparted to the disks by such a differential conveyor assembly effectively separates two or more overlapping disks since only the lowest disk is rotatively entrained and since an upper disk resists such rotation by reason of its inertia. Moreover, the centrifugal force created by the spin tends to increase any initial offset between the superposed disks and to move them apart. In addition, in the case of a track sloping either up or down in the direction of belt motion, the effect of gravity will also help individualize the overlapping parts inasmuch as only the lowermost one is restrained by the applied suction.

If, however, several disks are nested together so that these forces do not suffice to separate them, additional means must be employed to initiate their disengagement. To this end we prefer to provide, within the region of differential conveyance, a continuously moving impactor disposed above the track bed so as not only to give passage to a single disk entrained by the side belt but to strike any other disk riding thereon and to dislodge it from its nested position. Final separation then occurs as the bottom disk moves on while the top disk is physically arrested until it can drop down onto the track bottom.

The above and other features will be described in detail hereinafter with reference to the accompanying drawing in which:

FIG. 2 is a cross-sectional view taken on the line II — II of FIG. 1;

FIG. 3 is a top view of the assembly shown in FIG. 1;

FIG. 4 is a cross-sectional view taken on the line IV — IV of FIG. 3;

FIG. 7 is a sectional view taken on the line VII — VII of FIG. 3;

FIG. 8 is a fragmentary cross-sectional view taken on the line VIII — VIII of FIG. 7;

FIG. 9 is a view similar to FIG. 8, showing a modifications; and

FIG. 10 is a sectional view taken on the line X — X of FIG. 10.

Figure 1:
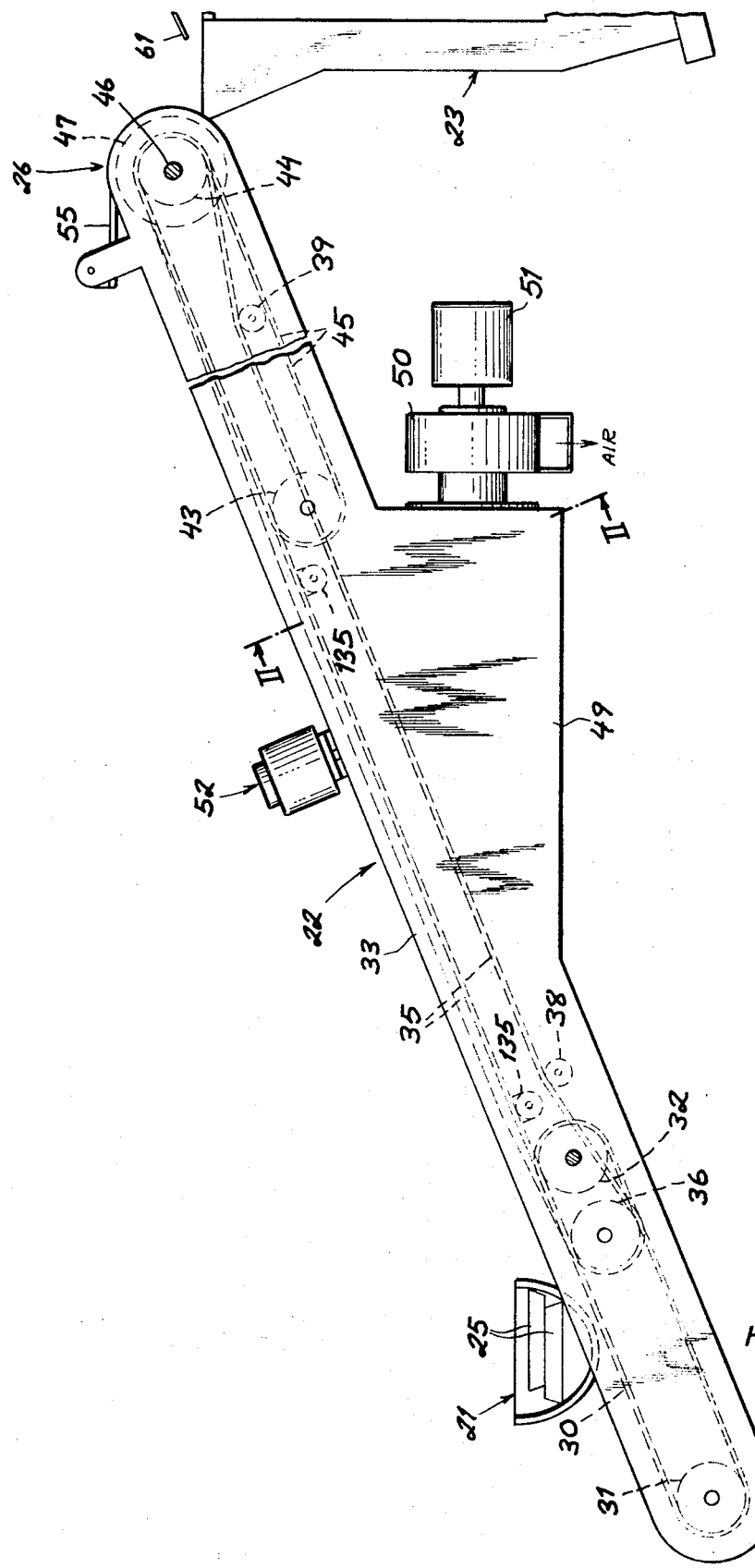
FIG. 1 is a somewhat schematic side-elevational view of a conveying, orienting and stacking device embodying our invention.

The assembly shown in the drawing comprises a supply unit 21, a rising transporter 22, a discharge chute 23 beyond that transporter, and a stacking device 24 receiving the conveyed articles from that chute. Unit 21 may comprise, as more fully described and illustrated in our copending application Ser. No. 19,798, a vibrating trough supported on a wheeled carriage allowing it to be pushed under the bed of an injection-molding machine for receiving plastic articles continuously produced thereby; these articles, here shown as shallow planoconcave disks 25 such as container lids, are continuously delivered to the foot of transporter 22.

The disks 25 need not be exactly planoconcave but could have their flat face slightly bulging or depressed, so long as one of their sides is distinctly concave to facilitate stacking.

As shown in FIG. 1, the trough 21 advantageously has a U-shaped cross-section with a transversely curved bottom so that any disk will contact the inner wall surface of that trough only on two diametrically opposite points. A disk carried piggyback on another one will not have such two-point contact and will therefore tend to slide off its carrier as the latter is tipped about its supporting axis under the weight of its rider.

The transporter, described in detail hereinafter, terminates in an orienting head 26 which serves to drop the oncoming disks 25 in a predetermined position, i.e., with their flat sides forward (to the right in FIGS. 1, 3 and 5 – 7), into the chute 23 which guides them to the stacking device 24. The latter, as illustrated in FIGS. 7 and 8, includes a pair of parallel and counterrotating shafts 27a and 27b, driven by a motor 27, which are mounted above a ramp 28 and are provided at their lower ends, beneath the outlet of chute 23, with screw threads 29a, 29b of opposite pitch adapted to receive a descending disk 25 between their turns and to advance it upwardly along the ramp. At the point where the threads terminate, the disks 25 nest to form a stack 125.

The lower part of transporter 22 comprises a broad belt 30 wound about a pair of rollers 31, 32, one or both of which are driven at a predetermined linear speed $v$ (e.g. of 30 cm per second) by a motor 70 via a transmission 71. A wall 33 forms a fixed guard rail along the right-hand edge of the transport track (as viewed in the direction of advance) and is rigid with a ledge 34 which extends in line with the upper surface of belt 30 as a continuation thereof. Ledge 34 has a width less than half that of belt 30 which in turn is slightly less than the diameter of the disks 25. Another endless belt 35 extends along the opposite, left-hand edge of the track from a location alongside belt 30 to the orienting head 26 at the outlet end of the track; belt 35, whose upper surface is inclined to the horizontal at an acute angle of about 10° to 30° as best seen in FIGS. 2 and 4, is supported by rollers 36, 37 (one of which is positively driven by motor 70 via a transmission 72) and is guided by idler rollers 38, 39 shown in FIG. 1. Belt 35 moves at a linear speed $2v$ which is also the speed of another endless belt 40, substantially coextensive with ledge 34, supported by rollers 41 and 42 with vertical axes. The active surface of belt 40 constitutes a movable guard rail which extends along the left-hand edge of the track but terminates short of the orienting head 26 in overlapping relationship with a further narrow belt 45; the latter passes around a pair of rollers 43, 44 in spaced relationship with belt 35 and in synchronism therewith. It will be noted from FIGS. 2 and 4 that the ledge 34 includes with wall 33 an obtuse angle, of about 100° to 120°, substantially equaling the angle included between the active surfaces of belts 35 and 40. Rollers 37 and 44 are mounted on a common shaft 46 which forms part of transmission 72 and also supports an intermediate roller 47 of slightly larger diameter. Belt 45 starts at the end of ledge 34 and forms a mobile continuation thereof.

The zone between ledge 34 and belt 35 is occupied by a grate 48 through which air is aspirated into a duct 49 underneath the track with the aid of a suction fan 50 driven by a motor 51. The reduced pressure thus created helps maintain the disks 25 in firm contact with the unsymmetrically positioned bottom belt 35, as best seen in FIG. 2.

An impactor 52, disposed substantially midway along the mobile guard rail 40, comprises a motor 53 driving an eccentric 54 (here shown as a short horizontal bar) which rotates at a level sufficiently high above grate 48 to leave room for a single disk 25 to pass underneath. If two such disks arrive at the impactor in nested position, the upper disk will be dislodged by the sharp blow of eccentric 54 striking its approaching periphery.

The disks 25 are deposited by unit 21 on conveyor belt 30 with random orientation and in partly overlapping relationship but are quickly separated upon entering the zone of grate 48 where a rotary motion (clockwise as seen in FIG. 3) is imparted to them by the edge belt 35 and, possibly, the guard belt 40. With the two belts 35 and 40 moving at twice the speed of belt 30, the forward velocity of the disks remains substantially unchanged in this region.

Disks that are not nested but merely overlapping are separated by the spin, as described above, before encountering the impactor 52. At the end of the unsymmetrical feeder assembly 33 – 35, 40, the hitherto dragging right-hand edge portions of the disks are gripped by the belt 45 which, moving at the same speed $2v$ as belt 40, accelerates the disks to twice their previous forward velocity while stopping their rotation. This causes a spreading of the disks moving toward the orienting head 26.

Figure 5:
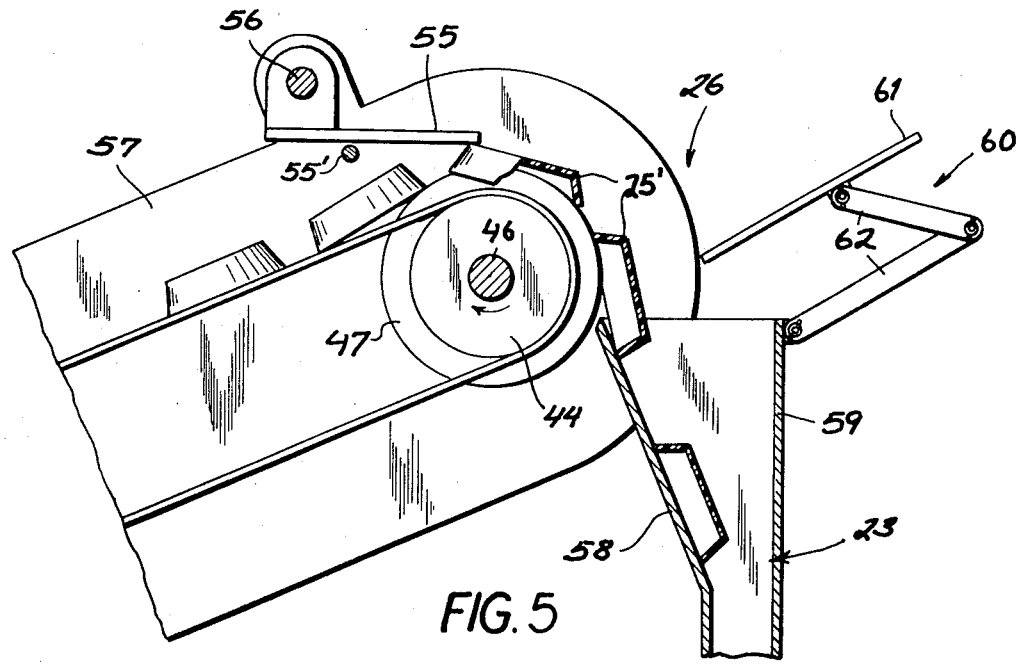
FIG. 5 is an enlarged sectional elevational view of an orienting head at the upper end of a transport track defined by the assembly of FIGS. 1 – 4.

Roller 47, serving as a deflector for the oncoming disks, is overhung by an eccentrically pivoted plate 55 (FIGS. 5 and 6) fulcrumed at 56 to a wall 57 which forms a stationary extension of guard belt 40; plate 55 bears under light pressure, by its own weight which could be supplemented by a weak spring, upon the arriving disks to ensure their partial penetration by the roller periphery if the recessed side of the disk faces downwardly as illustrated for a lid 25' in FIG. 5. In that case the disk or lid hugs the periphery of roller 47 upon which it comes to rest with diametrically opposite portions of its own periphery, the disk thereby following the curvature of the roller into the mouth of the chute 23 designed as a flat channel with a flared top. The disk therefore descends into the chute along a rear wall 58 of this guide channel, with its concavity turned toward that wall, and alights in the correct stacking position at the bottom of the channel between the worm shafts 27a and 27b.

The forward chute wall 59 carries a flipper 60 in the form of a shelf 61 adjustably supported thereon by an articulated linkage 62 which may be reset with the aid of thumb nuts 63, 64, 65 according to the size of the disks to be oriented. Shelf 61 is inclined at a small angle to the horizontal and points toward the periphery of roller 47 substantially at the level of its axis. The gap separating the roller 47 from the shelf 61 is insufficient to clear disk 25'', FIG. 6, arriving at the orienting head 26 with its concavity facing upwardly, such a disk steadied by the pressure plate 55 while being moved by the rotating roller 47 in a generally horizontal position across the chute entrance toward which it drops with the same general attitude until it strikes the lower edge of shelf 61. At that point the disk is flipped into a more nearly vertical position in which it enters the chute so as to face in the same direction as the disk 25' discussed in connection with FIG. 5. In the absence of a disk, plate 55 comes to rest upon a stop 55' spaced sufficiently from roller 47 to give clearance to the tallest disks to be processed.

The radius of deflecting roller 47 should be so related to the diameter and the depth of the disk concavity that the roller may enter its recess but preferably does not touch the bottom of that recess, as shown, in order to assure a positive entrainment of the disk through an arc of roughly 90°.

Figure 6:
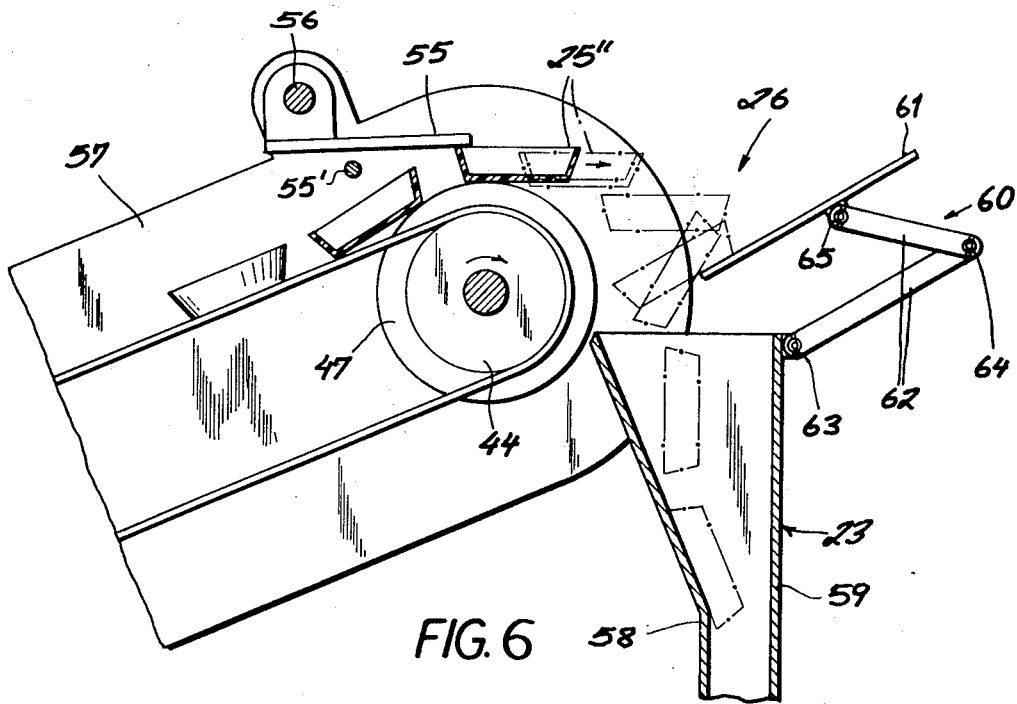
FIG. 6 is a view similar to FIG. 5 but showing a different orientation of entrained articles.

Although the aforedescribed rolling separation of overlapping disks is particularly advantageous in combination with an orienting head as shown in FIGS. 5 and 6, it will be understood that these features may also be utilized individually if articles of the character here invisaged are to be separated without stacking or are to be stacked without any opportunity of prior overlapping.

As best seen in FIGS. 2 and 4, the upper run of belt 35 rests on inclined idler rollers 135 designed to impart the desired slope to its active surface; the shafts of end rollers 36 and 37, however, are horizontal so that the belt is slightly twisted on entering and leaving the zone of differential feeding. If desired, belt 35 could be led entirely about inclined rollers and terminated at about the same point as belt 40, its continuation alongside belt 45 being then formed by a separate belt symmetrical to the latter.

In FIGS. 9 and 10 we have shown a modified chute 123 provided with two parallel, elongate rollers 127a, 127b on opposite sides of its plane of symmetry, these rollers forming a ramp for the oncoming disks 25 and rotating continuously in the same direction (clockwise in FIG. 9) and flanking a cylindrical brush 70 lying in that plane of symmetry. Brush 70, rising above the ramp, also rotates continuously in a sense (clockwise in FIG. 10) causing its bristles to grip the descending disks by their peripheral edges and to wedge them into the stack of disks already resting, with continuous counterclockwise rotation (FIG. 9), on the rollers 127a and 127b. The lower end of the stack is in contact with the brush 70 and is prevented by it from descending along the rollers.

We claim:

1. A device for orienting substantially flat articles of generally circular outline with a distinctly concave side, comprising:

conveyor means including a pair of transversely spaced and synchronized endless belts disposed alongside each other at an incline to the horizontal to form a rising transport track;

feed means for supplying a succession of articles to be oriented to said conveyor means, said articles having a width greater than the spacing of said belts for riding thereon to the top of said track;

an unsymmetrical feeder assembly forming part of said conveyor means ahead of said pair of belts for imparting rolling and forward motion to said articles, said assembly including a bottom belt and a side belt driven at substantially the same speed and forming two generally perpendicular active surfaces extending longitudinally of said track on one side of a centerline thereof, said assembly further including nondriven support means extending longitudinally of said track on the opposite side of said centerline;

orienting means at the top of said track including a deflecting body between said belts forming a curved hump adapted to enter the concave side of any article riding said belts with said concave side down, said hump extending over an arc sufficient to guide articles so disposed into a substantially vertical position over a path relatively close to the center of curvature of said body and to guide oppositely disposed articles into a substantially vertical position over a path relatively remote from said center of curvature;

guide means adjacent said body for receiving articles in said substantially vertical position;

and flipper means adjacent said body for intercepting and reorienting articles moving over one of said paths toward said guide means.

2. A device as defined in claim 1 wherein said body is a roller with an axis perpendicular to said track.

3. A device as defined in claim 2 wherein said guide means comprises a substantially vertical chute with a mouth substantially at the axial level of said roller.

4. A device as defined in claim 2 wherein said roller and said pair of belts are provided with drive means for rotating same at substantially identical peripheral speeds.

5. A device as defined in claim 4 wherein said guide means comprises a chute with an inlet end near the level of the axis of said roller, said flipper means means including a stationary member overhanging said inlet end in spaced relationship with the periphery of said roller.

6. A device as defined in claim 5 wherein said member is a shelf sloping downwardly toward said roller.

7. A device as defined in claim 2, further comprising a pressure member positioned above said path for urging said articles into contact with said roller.

8. A device as defined in claim 1, further comprising suction means on the track bottom between said bottom and side belts and said support means.

9. A device as defined in claim 1 wherein the active surface of said bottom belt slopes upwardly and outwardly at a small angle to the horizontal.

10. A device as defined in claim 9 wherein said support means comprises a sidewall and a shelf, the latter sloping upwardly and outwardly at substantially the same angle to the horizontal as the active surface of said bottom belt.

11. A device as defined in claim 1 wherein said bottom belt is integral with one of the belts of said pair.

12. A device as defined in claim 1 wherein said bottom and side belts and said pair of belts are connected to be driven at substantially the same linear speed, thereby increasing the separation of successive articles entering onto said pair of belts.

13. A device as defined in claim 1, further comprising continuously operative impactor means disposed at a level above the track bottom giving clearance to a single article entrained by said bottom and side belts for separating a plurality of articles advancing along said track in nested relationship.

14. A device as defined in claim 1 wherein said feed means comprises a vibrating trough with a substantially U-shaped cross-section and a transversely curved bottom.

15. A device for separating flat recessed articles capable of nesting, comprising:

supply means for delivering a multiplicity of such articles in at least partly overlapping relationship to an input end of a transport path;

differential conveyor means disposed along said path for imparting combined rolling and forward motion to said articles;

impactor means disposed for rotation about a generally vertical axis along said path at a level sufficiently elevated to give passage to a single article entrained by said conveyor means, and means for rotating said impactor means about said vertical axis, said impactor means partly overlying said path in line with the upper one of two superposed articles for disengaging same from each other.

16. A device as defined in claim 15 wherein said differential conveyor means comprises an endless driven belt moving along one longitudinal edge of said path and a nondriven support extending along the other longitudinal edge of said path.

17. A device as defined in claim 16 wherein said belt and said support are inclined in the direction of belt motion, further comprising suction means between said belt and said support for holding the lower one of two superposed articles in contact therewith.

18. A device as defined in claim 16 wherein said impactor means overhangs said driven belts.

* * * * *